_United States Patent Office_

3,014,020
Patented Dec. 19, 1961

3,014,020
POLYMERIZATION OF MONOOLEFINS WITH HEAT-ACTIVATED GROUP IV-A METAL OXIDE/ALUMINA CATALYSTS
Joseph Hendrickson Balthis, Jr., Mendenhall, Pa., assignor to E. I. du Pont de Nemours and Company, Wilmington, Del., a corporation of Delaware
No Drawing. Filed May 22, 1957, Ser. No. 660,762
14 Claims. (Cl. 260—94.9)

This invention relates to an improved process for polymerizing olefins, especially ethylene.

The use of unsupported and supported catalysts to polymerize ethylene to solid polymers is well known in the art. For example, such catalysts are disclosed in U.S. Patents 2,692,257, issued to Alex Zletz on October 19, 1954; 2,692,258, issued to Alex Zletz and Alan K. Roebuck on October 19, 1954; 2,692,259, issued to Edwin F. Peters on February 19, 1954; and 2,700,663, issued to Edwin F. Peters on January 25, 1955. More particularly these patents disclose polymerization of ethylene to high molecular weight, tough polymers, employing a catalyst comprised of a molybdenum-oxygen compound, in which the molybdenum is in the subhexavalent state, supported on gamma-alumina or on gamma-alumina containing appreciable amounts of titania or zirconia. The titania or zirconia are used to impart ruggedness to the catalyst. According to U.S. Patent 2,702,288 issued to Herman Hoeksema and Edwin F. Peters on February 15, 1955, solid polymers are obtained from ethylene by contacting the ethylene with a catalyst consisting of a molybdenum-oxygen compound in which the molybdenum is in the subhexavalent state combined with alumina, titania or zirconia, the catalyst being activated by heat treatment with a decomposable hydrocarbon formed as a deposit on the catalyst during the polymerization, said deposit being the fraction which is not removed by solvent extraction. In the above processes the molybdenum oxygen compound in which the molybdenum is in the subhexavalent state is an essential component of this catalyst composition. The art thus teaches that alumina and/or titania in combination with a subhexavalent molybdenum-oxygen compound is an active catalyst for polymerizing ethylene to solid polymers.

This invention provides a new process for polymerizing monoolefins in which the unsaturation is terminal, and especially for polymerizing ethylene to tough, solid polymers.

According to this invention, monoolefins are polymerized by bringing them into contact with a heat-treated group IV-A metal oxide-on-alumina catalyst.

The present invention is based on the discovery that heat-treated group IV-A metal oxides supported on alumina are catalysts for the polymerization of monoolefins, especially ethylene to tough, solid polymers. This discovery is very surprising because unreduced group IV-A metal compounds such as the oxides, have not heretofore been known to possess any activity for the polymerization of ethylene. These oxides have hitherto been used only as supports for ethylene polymerization catalysts.

These catalysts are made by heat-treating an oxygen containing a group IV-A metal compound-on-alumina in a non-reducing atmosphere under conditions providing for removal of volatile products at a temperature in excess of 400° C.. By a non-reducing atmosphere is meant an atmosphere which at the temperatures it is contacted with group IV-A metal oxide will not cause the lowering of the valence state of said group IV-A metal.

The group IV-A metals whose compounds are used in preparing the alumina supported oxides employed as catalyst in the process of this invention are titanium, zirconium, thorium and hafnium. These metals are the transition metals of group IV of the periodic table of elements and are listed as subgroup A in the periodic table of elements as illustrated on page 118 of Mellor's Modern Inorganic Chemistry, 1951 ed., Longmans Green and Company.

In its preferred embodiment, this invention comprises the use of such heat-treated group IV-A metal oxides-on-activated alumina as catalysts for polymerizing ethylene to tough polyethylenes.

In one method for preparing the heat-treated group IV-A metal oxide-on-alumina catalysts used in the practice of this invention, activated alumina pellets are impregnated with an organic solvent solution of a group IV-A metal alkoxide, e.g., titanium (IV) isopropoxide, $Ti(OC_3H_7)_4$. The titanium (IV) alkoxide is then hydrolyzed to form the hydrous titanium oxide on the alumina support. The hydrous titanium oxide-on-alumina is then placed in a heat-resistant tube mounted within an electric furnace, and dry air, oxygen, or an inert gas, e.g., helium, argon, etc., or air admixed with inert diluent gas, is passed over the charge at atmospheric pressure and a space velocity in the neighborhood of 10–1500 hr.$^{-1}$, while the temperature is raised to and maintained between 450° C. and 1000° C. The treatment is continued under these conditions for from 4–40 hours, or longer. The catalyst may be used at once or it may be cooled and stored in an inert, anhydrous atmosphere.

The chemical identity of the catalytically active component of the catalyst composition is not definitely known.

The alumina support may be a commercial preparation or it may be made in any known manner, and may be more specifically defined as gamma-alumina or amorphous alumina. Thus, the alumina may be made by dehydrating hydrous alumina as described in Ind. Eng. Chem. 42, 1398 (1950); U.S. 2,453,327, issued to William H. Claussen and Homer B. Wellman on September 13, 1949; and H. D. Weiser's "Colloid Chemistry," John Wiley and Sons, Inc., New York (1949), 2nd ed.; or by a gel precipitation from salt solutions as disclosed in U.S. Patents 2,432,286, issued to William H. Claussen and Homer B. Wellman on December 9, 1947; and 2,481,824, issued to William H. Claussen and Homer B. Wellman on September 13, 1949; or from metallic aluminum as disclosed in U.S. Patents 2,345,600, issued to Llewellyn Heard and Rodney V. Shankland and James C. Bailie on April 4, 1944; and 2,371,237, issued to Llewellyn Heard and Rodney V. Shankland and James C. Bailie on March 13, 1945. Particularly useful are commercial pelleted gamma-aluminas of ⅛ inch mesh containing 6% silica.

The heat-treated group IV-A metal oxide-on-alumina compositions are effective catalysts for polymerizing monoolefins and especially ethylene to essentially all high molecular weight polyethylenes. In such use the heat-treated group IV-A metal oxide-on-alumina can be employed in the form of pellets of spherical, cylindrical or other shapes. If desired, however, it can also be used in finely divided form.

In a convenient and practical method of operation with ethylene, a 400-cc. silver-lined reactor is preflushed and blanketed with nitrogen and charged with catalyst and an organic reaction medium, e.g., cyclohexane or xylene, in sufficient amount to occupy about one-fourth of the reactor volume. The charged oxygen-free reactor is cooled to about —35° C., evacuated, and then pressured with ethylene. The charged reactor is placed in a reciprocating rack equipped with heating means, and heating and agitation are started. When the temperature has reached the level selected for operation, the pressure is adjusted to the desired level by admitting ethylene under pressure. The reaction is permitted to proceed for at least one hour, during which time the pressure is maintained by periodic injections of ethylene. Usually the reactor becomes filled with solid polymer in 8 to 12 hours or less. Thereafter the reactor is allowed to cool, opened and the contents removed. The reaction product is a tough white solid containing embedded catalyst. If desired, the catalyst may be separated by extracting the polymer with an organic solvent, such as hot xylene, and filtering. The polymer may then be precipitated by pouring the filtrate into an excess of a non-solvent such as methanol. The precipitated polymer may be dried at room temperature or above and is a tough white solid. Optionally, the catalyst may be extracted, and this method is particularly useful when the polymer is of very high molecular weight. Operation in a flow system with a fixed bed of catalyst simplifies this problem by making it possible to recover the polymer directly from the effluent solvent, in pure, catalyst-free form.

The examples which follow are submitted to illustrate and not to limit this invention. The polymerization procedure employed in the examples is as described above, unless specifically described. Unless otherwise stated, inherent viscosity refers to measurements made at 0.1% concentration in tetrahydronaphthalene at 125° C.

EXAMPLE I

Gamma-alumina pellets were impregnated by permitting them to stand in a 10-volume percent solution of redistilled tetraisopropyl titanate in dry benzene (dried over Na) for 24 hours. The impregnated alumina was then separated by filtration, sucked dry, and allowed to soak for 24 hours in distilled water. After filtering and drying at 100° C. for 56 hours, the pellets were found by analysis to contain 1.81% Ti. Aliquots of this product were heated for 7 hours in a stream of argon (flow rate 300 ml./min.) at 300° C., 400° C., 500° C., 600° C., 700° C. and 800° C., respectively. The samples were then transferred under argon to dry argon-flushed glass tubes, sealed, and labelled A, B, C, D, E and F.

The catalystic activity of these preparations was evaluated as follows:

Five milliliters of heptene-1 (redistilled from calcium hydride under argon) was allowed to stand in contact with 1 g. portions of the above products in sealed, dry, argon-flushed, heat-resistant glass tubes at 25° C. and atmospheric pressure.

The amount of polymer formed during a certain time interval was determined by transferring the contents to approximately 20 ml. of heptene-1. Refluxing for 15–20 minutes yielded a uniform polymer solution, the refractive index of which was measured at 25° C. From a calibration chart of refractive index versus concentration of polyheptene-1 in heptene-1 monomer at 25° C. and the known volume of the solution, the amount of polymer was calculated.

Table I, below, gives the amount of polyheptene-1 produced per gram of catalyst after 66 and 160 hours of reaction, respectively.

Table I

| Sample | Polymer Yield mg. (66 hrs.) | Polymer Yield in g. (160 Hrs.) |
| --- | --- | --- |
| A | 0 | 23 |
| B | 14 | 60 |
| C | 70 | 163 |
| D | 178 | 257 |
| E | 247 | 277 |
| F | 286 | 318 |

The above results show that catalytic activity progressively increases with increasing temperature of activation.

EXAMPLE II

To a solution of 348 g. of thiophene-free benzene and 47.5 g. of tetraisopropyl titanate was added 400 g. of gamma-alumina with stirring. The flask was stoppered and allowed to stand for 24 hours, with frequent agitation. The impregnated alumina was then removed by filtration, sucked dry, and allowed to stand for 24 hours in 500 ml. of distilled water with frequent agitation. The treated alumina was separated by filtration and dried. There was obtained 432.2 g. of dry product. The product analyzed 2.09, 1.98% Ti.

The above material was divided into four portions labelled A, B, C and D, treated as follows, and then stored under argon in sealed containers.

| Sample | Treatment |
| --- | --- |
| A | Heat-treated at 700° C. in a stream of argon for 44.5 hours. |
| B | Heat-treated at 700° C. in a stream of oxygen for 16 hours followed by 5 hours in argon. |
| C | Heat-treated at 0.05 mm. pressure and 700° C. for 6 hours. |
| D | Heat-treated in a pre-evacuated sealed tube at 700° C. for 7 hours. |

A 5 ml. sample of heptene-1 was allowed to stand in contact with 1 g. of each of the above for 52 hours at atmospheric pressure and 25° C. The amount of polymer formed was determined as described in Example I. The results are shown in Table II.

Table II

| Sample: | Mg. of polymer obtained |
| --- | --- |
| A | 180 |
| B | 180 |
| C | 121 |
| D | 0 |

The above results show that heat-treatment in argon alone, or oxygen followed by argon, yields compositions of equivalent catalytic activity. On the other hand, if the heat-treatment is under conditions which do not provide for removal of decomposition products, the product is catalytically inactive (compare results in C and D).

EXAMPLE III

Alumina pellets (385 g.) were allowed to stand 24 hours in contact with a solution of titanium tetrachloride (44.2 ml.) in anhydrous n-heptane (398 ml.), separated, and dried briefly by evacuation at 25° C. The impregnated pellets weighed 467 g. and had a Ti content of 3.5% by weight. Part of the pellets (119.2 g.) was allowed to stand for 24 hours in a solution of ammonium hydroxide (50 ml.) in water (150 ml.) and then thoroughly washed in running water until the effluent was free of Cl⁻ and OH⁻. The resulting hydrous titania-on-alumina weighed 125.6 g., after drying at 100° C.

The above material was divided into two portions and treated as follows:

(1) A 42.05 g. portion was heated at 700° C. for 39 hours in argon, yielding 33.3 g. of titania-on-alumina.

(2) Another 42 g. portion was heated at 700° C. for 23 hours in pure, dry, oxygen, yielding 33.4 g. of titania-on-alumina.

The activity of the above preparations as catalysts for the polymerization of ethylene was evaluated as follows:

A 400 ml. pressure reactor which had been purged of oxygen was charged with 6.26 g. of the titanium oxide-on-alumina, prepared as in (1), and 100 ml. of cyclohexane. The reactor was then pressured intermittently with ethylene so that at 160°–178° C. the pressure was within the range of 1150–1500 lb./sq. in. These conditions were maintained for 12 hours. When the reactor was opened it was completely filled with polymer. Solvent was removed in vacuo at 95° C. The weight of dried polymer and catalyst was 201.3 g.

Following the procedure described above, the reactor was charged with 5.86 g. of the titanium oxide-on-alumina prepared as in (2) and 100 ml. of cyclohexane. After a 12 hour reaction period at 165–172° C. and 1250–1500 lb./sq. in. pressure, the mass of polyethylene and absorbed solvent completely filled the reaction tube. The weight of dried polymer and catalyst amounted to 174 g.

EXAMPLE IV

This example illustrates the preparation of isopropoxytitanium oxalate on alumina and its conversion to activated titania-on-alumina. The oxalate is polymeric and is believed to possess the formula

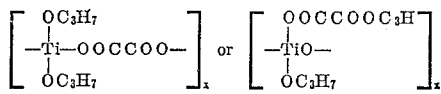

Alumina pellets (280.7 g.) were impregnated with tetraisopropyl titanate (49.9 g.) dissolved in n-heptane (450 ml.), isolated under anhydrous conditions, and dried by evacuation at room temperature. Conversion to the oxalate was effected by immersing the impregnated pellets in a solution of dehydrated oxalic acid (31.7 g.) in anhydrous isopropyl alcohol (400 ml.) for two weeks. The pellets were again isolated, dried at about 25° C. in the absence of moisture, and found to weigh 353.1 g. Part of the isopropoxytitanium oxalate-on-alumina pellets (72.19 g.) was pyrolyzed for 41 hours in argon at 700° C. The resulting light gray titania-on-alumina (58.1 g.) had Ti, C, and H contents of 2.51%, 0.12%, and 0.27%, respectively, a surface area of 315 sq. m./g., and by X-ray diffraction consisted of gamma-alumina, traces of α-quartz and rutile titanium dioxide, and amorphous material. A 5.0 g. portion of the heat treated material in 100 ml. of cyclohexane brought about the formation of 173 g. of solid polyethylene at 160° C. and 1700 lb./sq. in. ethylene pressure.

EXAMPLE V

This example illustrates the preparation of isopropoxyzirconium oxalate on alumina and its conversion into a polymerization catalyst.

Alumina pellets (177.1 g.) were impregnated in a cyclohexane/n-heptane solution (272 ml.) containing tetraisopropyl zirconate (0.072 mole). The pellets were separated, dried in the absence of moisture, and immersed in a solution of dehydrated oxalic acid (0.144 mole) in isopropyl alcohol (214 ml.). The dried isopropoxyzirconium oxalate-on-alumina weighed 216.5 g. and had a Zr content of 3.2% by weight. Pyrolysis in argon for 41 hours at 700° C. resulted in an almost white zirconia-on-alumina. A 5.86 g. portion of this product in 100 ml. of cyclohexane at 225° C. and 2500 lb./sq. in. ethylene pressure induced formation of 8 g. of solid polyethylene in the form of bean-sized balls.

EXAMPLE VI

This example illustrates the use of an organo-soluble, polymeric, hydroxyl-containing titanium carboxylate such as described in U.S. 2,621,194 issued to Joseph H. Balthis on December 9, 1952, as a source of the titania.

Alumina pellets (159.5 g.) were allowed to soak for 96 hours in a solution of polymeric hydroxytitanyl stearate (146.3 g.) in benzene (150 ml.), separated, washed with benzene (100 ml.), and dried in vacuo at room temperature. The product weighed 190.5 g. Part of the pellets (71.48 g.) was pyrolyzed in argon for 44.5 hours at 700° C. They became gray-black in color, weighed 59.5 g., and contained 1.61%, 0.46%, and 0.75% titanium, carbon and hydrogen, respectively. Use of 5.81 g. of these pellets as the polymerization catalyst in 100 ml. of cyclohexane caused the formation of 79.3 g. of solid polyethylene at 170–225° C. and 2200–2500 lb./sq. in. ethylene pressure.

EXAMPLE VII

This example illustrates the use of polymeric isopropoxytitanyl stearate as a source of titania. This precursor contained titanium atoms bridged together in chains by means of oxygen atoms. Residual titanium valences were satisfied with —OC$_3$H$_7$ and —OOCC$_{17}$H$_{35}$ groups.

Polymeric isopropoxytitanyl stearate (197.2 g.) was dissolved in benzene (200 ml.) and used to impregnate alumina pellets (231.9 g.). The pellets were separated, dried in nitrogen and in vacuo, and found to weigh 302.5 g. Some of the impregnated pellets (105.6 g.) were pyrolyzed in argon at 700° C. for 47 hours. The dark gray product was largely amorphous to X-rays, weighed 83.7 g., and had titanium, carbon, and hydrogen contents of 6.10%, 0.50%, and 0.59%, respectively. Only α-quartz and gamma-alumina were detected by X-ray diffraction. A 5.99 g. portion of the heat treated titania-on-alumina in 100 ml. of cyclohexane caused the formation of 94.2 g. of polyethylene at a maximum temperature and pressure of 122° C. and 1000 lb./sq. in. ethylene respectively.

EXAMPLE VIII

This example illustrates the preparation of polymeric isopropoxytitanium malonate on alumina and its activation by pyrolysis at 500° C. or 700° C. The malonate probably had the formula

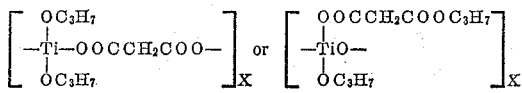

Tetraisopropyl titanate (0.336 mole) was dissolved in benzene (600 ml.) and dried malonic acid (0.336 mole) was added. A little solid precipitated and failed to redissolve during separation of 119 ml. of isopropyl alcohol-benzene azeotrope boiling at 70.1–71.2° C. Undissolved solid was separated and the liquid phase was used to impregnate 231.5 g. of alumina pellets. The resulting pellets weighed 274.7 g. after drying and contained 3.04% Ti by weight.

Part of the impregnated pellets (98.2 g.) was heated in a current of argon for 43.5 hours at 700° C. They become gray in color, weighed 85.8 g. and had titanium, carbon, and hydrogen contents of 3.47%, 0.25%, and 0.61%, respectively. A 5.33 g. portion of the catalyst in 100 ml. of cyclohexane induced the formation of 153.1 g. of solid polyethylene at 150° C. and 1500 lb./sq. in. ethylene pressure.

Another portion of the isopropoxytitanium malonate on alumina (20 g.) was activated by heating in argon for 5 hours at 504–536° C. A 6.37 g. portion of the grayish-black solid brought about the formation of 199.1 g. of solid polyethylene at 165–185° C. and 1200–1500 lb./sq. in. ethylene pressure. The polyethylene had an inherent viscosity of 12.5 and by infrared data contained 0.5 vinyl group per 2000 carbon atoms, no detectable methyl or vinylidene groups, and unsaturated corresponding to 0.1 trans hydrogen per 2000 carbon atoms.

EXAMPLE IX

This example illustrates the preparation of a catalyst from isopropoxytitanium maleate on alumina. One sample was activated in especially dehydrogenated argon to demonstrate that activation was not the result of reduction by hydrogen possibly present in the argon as an impurity.

Polymeric isopropoxytitanium maleate was prepared by adding maleic acid (0.336 mole) to tetraisopropyl titanate (0.336 mole) dissolved in benzene (600 ml.). Precipitation started soon after addition was completed but the precipitate redissolved during the removal of 142 ml. of isopropyl alcohol/benzene azeotrope, boiling at 71.7–72.4° C. The solution was used to impregnate 210.8 g. of alumina pellets which weighed 260.2 g. after isolation and drying in nitrogen.

One portion (95.74 g.) of the pellets was heated for 40 hours at 700° C. in argon which had been deoxidized over copper at 402–415° C. and dried. The resulting black pellets weighed 80.7 g. and had titanium, carbon and hydrogen contents of 6.55%, 1.38%, and 0.75%, respectively. A 6.04 g. portion of this product in 100 ml. of cyclohexane induced the formation of 196.6 g. of solid polyethylene at 170–190° C. and 1000–1500 lb./sq. in. ethylene pressure. The temperature rose abruptly from 171° C. to 190° C. as the exothermic polymerization commenced.

A second portion of maleate on alumina (70.27 g.) was activated in argon which had been dehydrogenated by passage through copper oxide at 396–412° C., deoxidized by passage through copper at 405–412° C., and dried with calcium surfate and phosphorus pentoxide. The activated pellets weighed 59.0 g., and a 5.93 g. portion of the heat treated pellets in 100 ml. of cyclohexane brought about the formation of 110 g. of solid polyethylene at 210–225° C. and 1360–2500 lb./sq. in. ethylene pressure.

The inclusion of a liquid medium in the reaction zone in contact with the catalyst produces a desirable effect, facilitating temperature control and improving contact between monomer and catalyst. Various classes of individual hydrocarbons or mixtures of hydrocarbons which are liquid and substantially inert under polymerization conditions can be employed. Examples of such hydrocarbons are benzene, toluene, xylene, xylene-p-cymene mixtures, cyclohexane, tetrahydro- and decahydronaphthalenes, t-butylbenzene, ethylxylenes, etc.

In a batch process the liquid reaction medium generally occupies about one-fourth of the reactor volume. In continuous operation, however, the liquid reaction medium may be present in amount which may range from about 10 to about 1000% by weight of the ethylene being processed.

The polymerization may be effected in the gaseous phase in the absence of a reaction medium. In this case the catalyst may be employed in the form of fluidized particles, as a fixed bed, or as a counter-current or cocurrent bed of particles. A moving bed or slurry of catalyst in the liquid hydrocarbon medium can be used and allowed to flow downwardly through a tower, and monoolefin alone or monoolefin dissolved in a suitable hydrocarbon medium can be injected into the lower portion of the tower or at various elevations within the tower. Slurry of catalyst and polymer is withdrawn and unconverted monoolefin recycled into the reaction zone.

The particular pressure at which the polymerization is effected depends upon such interdependent factors as nature of monoolefin, temperature, and activity of the catalyst. As a rule with ethylene, it is not necessary to use ethylene pressures above 1000 atmospheres to obtain good conversions of the ethylene at reasonable rates. Most generally the pressure will be between atmospheric and 200 atmospheres.

The temperature at which the polymerization is effected can be varied over wide limits. Thus, it may vary from that of the room to 350° C. With active catalysts and pressures of 1–100 atmospheres, the temperature will lie between 25° and 225° C.

The amount of catalyst is not a critical factor. Operating batchwise catalyst concentrations of 0.01 to 10% by weight of the monomer are useful. The polymerization is independent of the quantity of catalyst employed as long as monomer is continuously added to the reaction zone and an excess of monomer is available for polymerization.

Under the preferred conditions of temperature and pressure in a batch process employing from 1 to 10 g. of catalyst in a 400 cc. reactor, the time of reaction is usually at least one hour and may be continued until the activity of the catalyst is exhausted.

The catalysts used in the process of this invention have particular value for polymerizing ethylene to essentially all solid high molecular weight tough polyethylenes in high yields. However, catalytic activity is not limited to ethylene. Monoolefins which have terminal ethylenic unsaturation may similarly be polymerized by the process of the present invention. Especially useful are the short chain monoolefins such as ethylene, propylene, the butylenes, and hexenes. The catalysts may further be employed in the copolymerization of terminally unsaturated olefins.

It is to be understood that any method which brings about intimate association of the titania with the alumina support may be used in preparing the catalysts of this invention. Thus, instead of depositing the group IV–A metal compound on the alumina from an organic solvent solution, it may be deposited from aqueous solution.

Alternatively, a group IV–A metal alkoxide may be deposited on the support by adsorption or direct contact of liquid ester with the support.

Alumina supported group IV–A metal compounds useful in the formation of the catalysts are group IV–A metal oxides and other oxygen-containing group IV–A metal compounds, which on heating are converted to oxides and any salt of an inorganic or organic acid which can be converted by aqueous, acidic, or alkaline hydrolysis to the hydrous oxide. Examples are:

(1) Esters of the type M(OR)$_4$, in which M is titanium, zirconium, thorium or hafnium and R is alkyl, cycloalkyl, aryl, or aralkyl. Examples of such compounds are tetraethyl zirconate, tetrabutyl titanate, tetraamyl hafnate, tetraoctyl thorate, tetraoctylphenyl titanate, etc. These esters may be partially hydrolyzed before use, if desired.

(2) Monomeric or polymeric acylates of titanium, zirconium, thorium or hafnium, examples of which are titanyl acetate, zirconium tetrapropionate, zirconyl, stearate, hafnium tetravalerate, thorium tetraacetate, etc.

(3) Ester carboxylates containing recurring

units, wherein M and R have the previously indicated meanings, examples of which are isopropoxyzirconyl laurate, ethoxytitanyl acetate, butoxytitanyl butyrate, decyloxythoryl decanoate, etc.

(4) Soluble salts of inorganic acids such as the chlorides, nitrates, etc., of titanium, zirconium, hafnium and thorium.

The alumina support employed in the process of the present invention need not comprise alumina exclusively; an inert third component, such as silica, may be present, but no particular advantage is gained thereby. Alumina may not be completely replaced and is necessary to the formation of the catalyst. The ratio of the group IV–A metal oxide to the alumina support is not critical and is only limited by the methods of intimately admixing the support and the group IV–A metal oxide.

Drying prior to impregnation increases the absorptivity of the support and eliminates water, which may bring about undesirable side reactions. Catalyst supports are generally pre-dried in air at 400 to 500° C.

The heat treatment of the group IV–A compound-on-alumina is effected at temperatures which are at least as high as 400° C. but below 1000° C. Generally the best results are obtained within the more restricted range of 600–850° C.

The heat treatment may be effected under reduced pressures or in the presence of non-reducing gases such as dry air, oxygen, argon, helium, etc.

As a rule the heat treatment is carried on for no less than 30 minutes and generally for not more than 40 hours because this has no practical advantage and adds to the cost.

Heat treated titania-on-alumina compositions may be adversely affected by moisture and are therefore preferably stored in the substantial absence of air and moisture.

I claim:

1. The process of polymerizing terminally unsaturated olefins to solid polymers which comprises contacting at least one aliphatic monoolefin containing 2 to 7 carbon atoms, with a catalyst consisting essentially of an oxide of a metal of group IV–A of the periodic table of elements supported on alumina, said catalyst being the product obtained by heating an oxide of a group IV–A metal supported on alumina in a non-reducing atmosphere at a temperature of at least 400° C. under conditions providing for the removal of volatile products.

2. The process as set forth in claim 1 wherein the transition metal oxide extended on alumina is titanium.

3. The process as set forth in claim 1 wherein the non-reducing atmosphere is an oxygen containing gas.

4. The process as set forth in claim 1 wherein the non-reducing atmosphere is an inert gas.

5. The process as set forth in claim 1 wherein the terminally unsaturated olefin is ethylene.

6. The process of polymerizing terminally unsaturated olefins to solid polymers which comprises contacting at least one terminally unsaturated olefin containing 2 to 7 carbon atoms, with a catalyst consisting essentially of the product obtained by impregnating alumina with a solution of a compound of a metal of group IV–A of the periodic table, hydrolyzing said group IV–A metal compound on alumina and heating the resulting metal oxide on alumina to at least 400° C. in a non-reducing atmosphere under conditions providing for the removal of volatile products.

7. The process as set forth in claim 6 wherein the group IV–A metal compound is an alkoxide.

8. The process as set forth in claim 6 wherein the group IV–A metal compound is an acylate.

9. The process as set forth in claim 6 wherein the group IV–A metal compound is a titanium compound.

10. The process as set forth in claim 9 wherein the titanium compound is a titanium alkoxide.

11. The process as set forth in claim 9 wherein the titanium compound is a titanium acylate.

12. The process of polymerizing ethylene to solid polyethylene which comprises contacting, at a temperature of 25° to 350° C. and at a pressure of 1 to 1000 atmospheres, ethylene in the presence of an inert liquid hydrocarbon with a catalyst consisting essentially of the product obtained by heating a metal oxide extended on alumina, wherein the metal is an element of group IV–A of the periodic table of elements, to a temperature of 400 to 1000° C. for a period of 4 to 40 hours in a non-reducing atmosphere and removing the volatile products formed.

13. The process as set forth in claim 12 wherein the group IV–A metal oxide is titanium.

14. The process as set forth in claim 12 wherein the group IV–A metal oxide is zirconium.

References Cited in the file of this patent

UNITED STATES PATENTS

| | | |
|---|---|---|
| 1,682,242 | Patrick | Aug. 28, 1928 |
| 1,873,536 | Brown et al. | Aug. 23, 1932 |
| 2,129,732 | Fulton et al. | Sept. 13, 1938 |
| 2,344,911 | Young | Mar. 21, 1944 |
| 2,349,904 | Hachmuth | May 30, 1944 |
| 2,697,066 | Sieg | Dec. 14, 1954 |
| 2,739,132 | Riedl | Mar. 20, 1956 |
| 2,791,575 | Feller et al. | May 7, 1957 |
| 2,810,699 | Voltz et al. | Oct. 22, 1957 |
| 2,928,814 | Mills | Mar. 15, 1960 |

UNITED STATES PATENT OFFICE
CERTIFICATE OF CORRECTION

Patent No. 3,014,020                      December 19, 1961

Joseph Hendrickson Balthis, Jr.

It is hereby certified that error appears in the above numbered patent requiring correction and that the said Letters Patent should read as corrected below.

Column 5, lines 14 to 17, the second formula should appear as shown below instead of as in the patent:

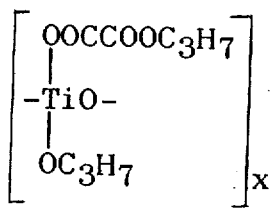

column 6, line 57, for "unsaturated" read -- unsaturation --; lines 65 and 66, for "impority" read -- impurity --; same column 6, line 72, for "axeotrope" read -- azeotrope --; column 8, line 34, after "zirconyl" strike out the comma.

Signed and sealed this 24th day of April 1962.

(SEAL)
Attest:

ESTON G. JOHNSON
Attesting Officer

DAVID L. LADD
Commissioner of Patents